(12) United States Patent
Foster et al.

(10) Patent No.: US 6,390,700 B1
(45) Date of Patent: May 21, 2002

(54) ABSOLUTE LOCATION LOW WEAR BEARING FOR AN IMAGING APPARATUS

(75) Inventors: Larry Steven Foster; Darin M. Gettelfinger; John Paul Spicer, all of Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/613,921

(22) Filed: Jul. 11, 2000

(51) Int. Cl.$^7$ .................................................. B41J 2/01
(52) U.S. Cl. ........................ 400/624; 400/639; 384/145; 384/192; 384/255; 384/302
(58) Field of Search .................................. 400/624, 283, 400/354, 354.1, 354.2, 354.3, 639; 384/145, 192, 255, 302; 74/498

(56) References Cited

U.S. PATENT DOCUMENTS

| | | | |
|---|---|---|---|
| 805,136 A | 11/1905 | Harting | |
| 1,200,779 A | 10/1916 | Thompson | |
| 1,593,251 A | * 7/1926 | Flintermann | |
| 3,623,379 A | * 11/1971 | Bradshaw | ...................... 74/498 |
| 3,785,711 A | * 1/1974 | Bliemeister | ............. 308/237 R |
| 3,887,249 A | * 6/1975 | Rouch | .......................... 308/73 |
| 4,218,933 A | * 8/1980 | Allen | ........................... 74/422 |
| 4,297,045 A | 10/1981 | Burton et al. | |
| 4,597,676 A | * 7/1986 | Vohr et al. | ................... 384/114 |
| 4,729,557 A | 3/1988 | Kiyohara | |
| 5,366,305 A | 11/1994 | Christianson | |
| 5,598,201 A | 1/1997 | Stodder et al. | |
| 5,622,085 A | * 4/1997 | Kostrzewa | .................... 74/498 |
| 5,778,731 A | * 7/1998 | Heep | ............................ 74/498 |
| 5,820,067 A | 10/1998 | Orbons et al. | |
| 5,906,138 A | * 5/1999 | Kostrzewa | .................... 74/498 |
| 5,937,703 A | * 8/1999 | Engler | ......................... 74/498 |
| 6,042,228 A | * 3/2000 | Yamada | ....................... 347/104 |
| 6,076,417 A | * 6/2000 | Engler | .................... 74/388 PS |
| 6,178,843 B1 | * 1/2001 | Machida et al. | .............. 74/498 |

\* cited by examiner

*Primary Examiner*—Andrew H. Hirshfeld
*Assistant Examiner*—Kevin D. Williams
(74) *Attorney, Agent, or Firm*—Taylor & Aust P.C.

(57) ABSTRACT

A bearing for an imaging apparatus includes a first bearing flank including a first bearing surface having a shape in cross-section defined by a first arc having a first radius extending from a first surface axis. The bearing further includes a second bearing flank including a second bearing surface having a shape in cross-section defined by a second arc having a second radius extending from a second surface axis. The first bearing flank and the second bearing flank are structured and adapted such that the first bearing surface and the second bearing surface together in cross-section form a concave shape, and such that the first bearing surface and the second bearing surface are non-concentric. Alternatively, the first and second bearing flanks can be replaced by roller bearings.

13 Claims, 4 Drawing Sheets

ABSOLUTE LOCATION LOW WEAR BEARING FOR AN IMAGING APPARATUS

BACKGROUND OF THE INVENTION

1. Field of the Invention

The present invention relates to an imaging apparatus, and more particularly, to a feed roller shaft bearing for an ink jet printer.

2. Description of the Related Art

Traditional inkjet printers operate by incremental motion of media through a print zone. This print zone is typically defined by the width of the ink jet print head. Therefore, for full page coverage, the media can not index more than one print head width. It is critical that on such index increments that the media is moved very precisely, so that there is not a white gap due to overfeeding or a dark band due to overlapping of adjacent print head swaths.

Traditional ink jet indexing is achieved with open loop stepper motor driven systems. These systems typically consist of a stepper motor, gears, and a feed roller. Gear transmission error and variations in the diameter and run out of the feed roller combine to yield an unacceptable level of index accuracy. Therefore, an index which is the full width of the print head is typically done only in a "draft" or "economy-fast" mode, in which print quality is not critical. In order to produce high quality prints from such a system, a process known as "shingling" is implemented. Shingling involves making multiple passes over a specified area and laying down print swaths one on top of another. While this successfully masks indexing errors, the throughput of the printer suffers a significant penalty.

Another approach is to use a less traditional closed loop indexing system which involves placing a high resolution encoder disc on a feed roller along with an analog output sensor. The use of such a closed-loop system essentially eliminates any errors upstream of the feed roller from the motor and the gears. An essential component of the hardware in a closed loop system for reducing index inaccuracies is the feed roller bearing.

FIG. 1 shows a traditional round bearing design which includes a round bearing 10 which surrounds a round feed roller shaft 12. Generally, a round bearing made of a particular material will exhibit superior wear characteristics in comparison to other bearing configurations made of the same material. However, the tolerances associated with the round bearing design are unacceptable for accurate indexing unless an extremely accurate biasing system is used. Expected tolerances on the traditional round bearing design might be +/−0.01 mm on the shaft and +/−0.025 mm on the molded bearing, resulting in a 0.07 mm worse case diametral clearance. This clearance could be reduced with costly machine operations, but can not be completely eliminated.

FIG. 2 shows a traditional V-bearing 14 having a first flank 16 and a second flank 18. Flanks 16 and 18 include flat surfaces 20 and 22, respectively, which form a V-shaped cradle for cradling feed roller shaft 12. One advantage of the V-bearing in comparison to the round bearing is that the V-bearing provides for absolute location (0 clearances) between the flat surfaces 20, 22 and feed roller 12. Another advantage that the V-bearing configuration has over the traditional round bearing design is that the bearing does not occupy the area directly above the feed roller and thus, the print head carrier can travel directly over the bearing so as to be as close to the feed roller as possible. The distance between the print head and the feed roller directly impacts the size of the bottom margin of media, and should be held to a minimum. One significant problem associated with the V-bearing design, however, is that high pressure is created at the contact area between the flat surfaces 20, 22 of the flanks 16, 18 and the feed roller 12, resulting in significant wear of V-bearing 14 and/or feed roller shaft 12.

Pressure×velocity (PV) is a fundamental calculation that is used to select bearing materials for engineering applications. The pressure in round bearings, such as the type shown in FIG. 1, is approximated by the equation: velocity× [radial load/(bearing diameter×bearing length)]. The velocity is represented by the surface velocity of the shaft at the bearing interface. The V-bearing design shown in FIG. 2 can not be estimated by the round bearing equation, but can be calculated by estimating the contact area from the deformation of a simple cylinder on a flat plate.

If an application is chosen in which the specified PV limit for a given material is exceeded, a more severe level of wear will result. For example, one such polyimide material having a limiting PV rating of approximately 300,000 PSI×Ft./Min. is very expensive and difficult to manufacture. Tests conducted on this material in a V-bearing design exhibited a vertical feed roller drop of approximately 0.08 mm over the period of the test. A similar V-design with a more cost effective injection moldable material (and lower limiting PV rating, typically in the range of 10,000–150,000 PSI×Ft./Min.) would result in significantly increased and unacceptable wear over the same period.

Accordingly, a need exists for an economical bearing which provides absolute location of a feed roller shaft and exhibits low wear characteristics so that the location of the center of the feedroll will not change over time.

SUMMARY OF THE INVENTION

One aspect of the invention is a bearing for locating a feed roller shaft in an imaging apparatus. The feed roller shaft includes a shaft surface having a cylindrical shape and has a shaft radius extending from a rotational axis of the feed roller shaft to the shaft surface. The bearing includes a first bearing flank including a first bearing surface having a shape in cross-section defined by a first arc having a first radius extending from a first surface axis. The bearing further includes a second bearing flank including a second bearing surface having a shape in cross-section defined by a second arc having a second radius extending from a second surface axis. The first bearing flank and the second bearing flank are structured and adapted such that the first bearing surface and the second bearing surface together in cross-section form a concave shape, and such that the first bearing surface and the second bearing surface are non-concentric.

In another embodiment, the invention is directed to an imaging apparatus having a frame, a feed roller assembly and a bearing assembly. The feed roller assembly includes a feed roller shaft having a cylindrical shaft surface, and at least one feed roller secured to the feed roller shaft. A shaft radius extends from a rotational axis of the feed roller shaft to the cylindrical shaft surface. The bearing assembly is coupled to the frame for locating the feed roller shaft. The bearing assembly has a plane of symmetry positioned to intersect the rotational axis of the feed roller shaft. The bearing assembly includes a first roller bearing including a first bearing surface having a first radius extending from a first bearing axis, and a second roller bearing including a second bearing surface having a second radius extending from a second bearing axis. The cylindrical shaft surface tangentially contacts each of the first bearing surface and the second bearing surface at an angle in the range of about 21 degrees to about 45 degrees as measured from a line perpendicular to the tangential contact with respect to the plane of symmetry.

An advantage of the present invention is that a feed roller shaft can be precisely positioned in an imaging apparatus for absolute location of the feed roller shaft.

Another advantage is that the invention provides a low-wear design which maintains the feed roller shaft location consistent over the life of the printer, and in particular, essentially eliminates any undesirable vertical drop of the feed roller which would result in an increased printhead to print media gap and change the location of critically positioned components, such as an encoder, which may be mounted to the feed roller shaft.

Still another advantage is that both absolute location of the feed roller shaft and a low wear bearing are provided in a bearing structure using conventional inexpensive thermoplastics, such as injection moldable materials having a limiting PV rating of 10,000 to 150,000 PSI×Ft./Min.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
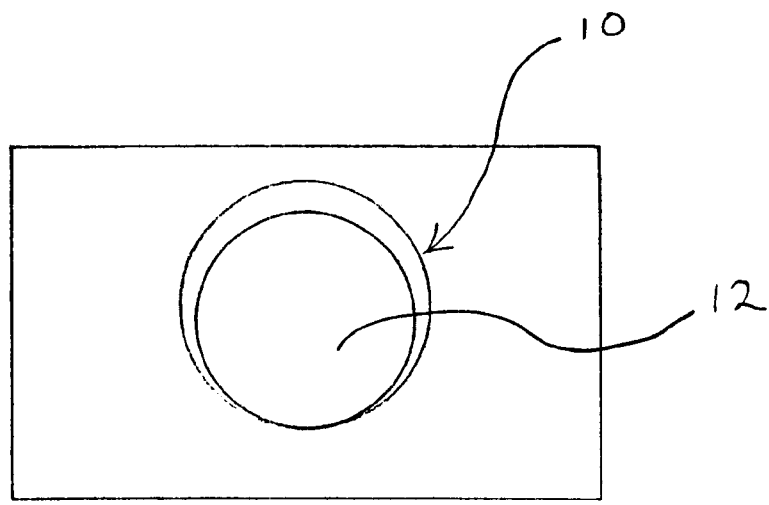
FIG. 1 is a schematic illustration of a prior art round bearing.
Figure 2:
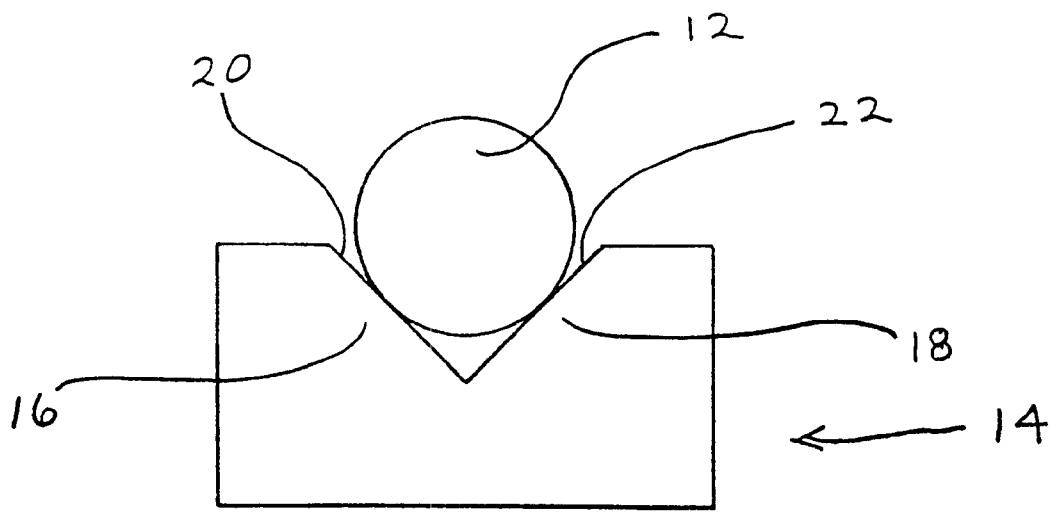
FIG. 2 is a schematic illustration of a prior art V-shaped bearing.
Figure 3:
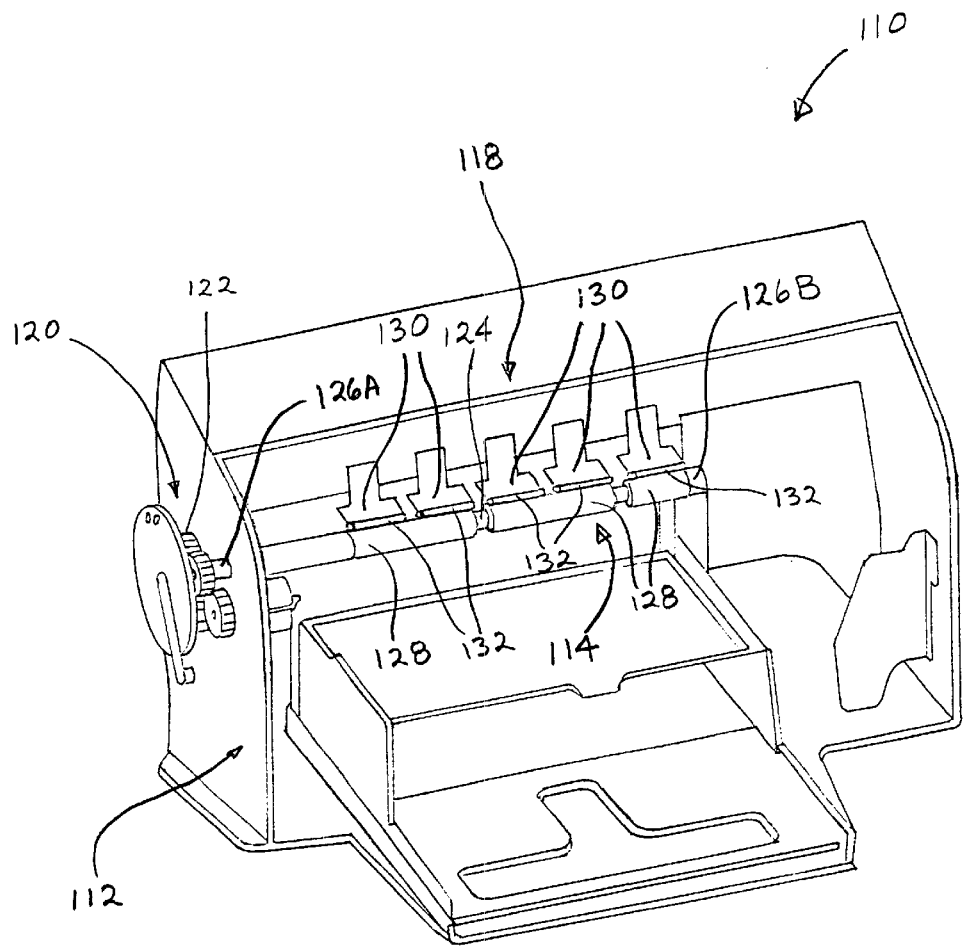
FIG. 3 shows in perspective view a portion of an imaging apparatus of the invention.
Figure 4:
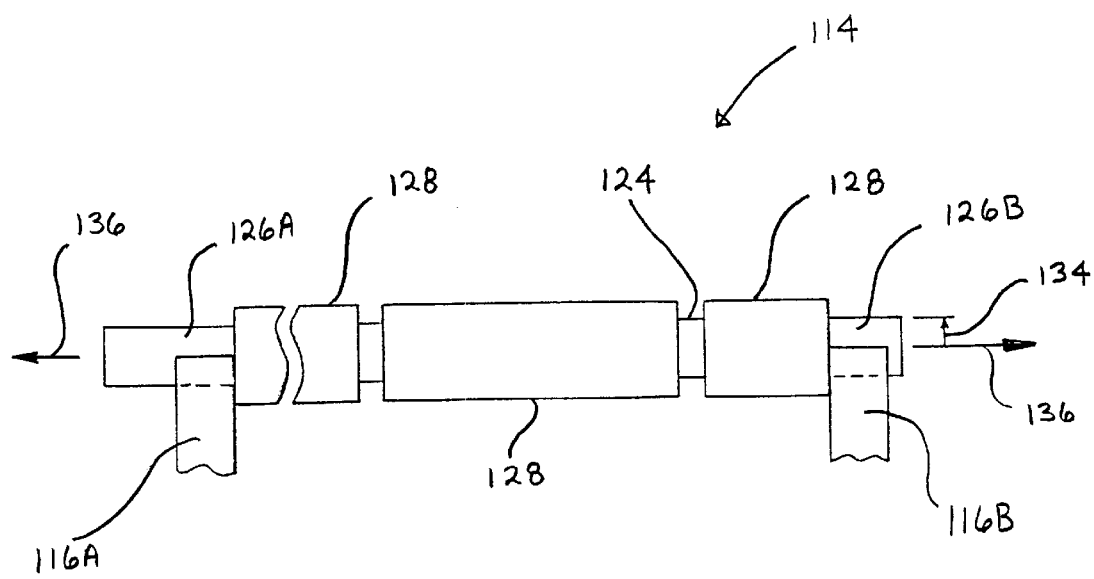
FIG. 4 is a front view of a feed roller shaft being carried by a bearing structure of the invention.

Referring now to the drawings and particularly to FIGS. 3 and 4, there is shown a portion of an imaging apparatus 110, such as an ink jet printer, including a frame 112, a feed roller assembly 114, a first bearing 116A, a second bearing 116B, a backup roller assembly 118, and a gear train 120.

As shown in FIG. 4, feed roller assembly 114 includes a feed roller shaft 124 having a first cylindrical shaft surface 126A and a second cylindrical shaft surface 126B located at opposing ends of feed roller shaft 124. Located between first cylindrical shaft surface 126A and a second cylindrical shaft surface 126B is a plurality of feed rollers 128. Feed rollers 128 each include a hole (not shown) for receiving feed roller shaft 124. Each of feed rollers 128 may be attached to feed roller shaft 124, for example, by a press fit, a keyed shaft, adhesive, or by a fastener, such as a pin or screw. Preferably, the external surface of feed rollers 128 is coated with a tungsten carbine thermal spray coating. Alternatively, feed rollers 128 are entirely composed of tungsten applied directly to feed roller shaft 124.

First bearing 116A and second bearing 116B are located and attached to frame 112 to cradle first and second cylindrical surfaces 126A, 126B, respectively. First and second bearings 116A, 116B are open faced bearings, and thus, do not occupy all the space around the first and second cylindrical surfaces 126A, 126B. Referring again to FIG. 3, feed roller shaft 124 is held in contact with first and second bearings 116A, 116B by a downward force exerted by backup roller assembly 118.

Backup roller assembly 118 includes a plurality of loading members 130 and a corresponding plurality of backup rollers 132. Each backup roller 132 is rotatably connected to a distal end of a corresponding loading member 130. A proximal end of each loading member 130 is attached to printer frame 112. Backup roller assembly 118 is positioned such that backup rollers 132 contact and apply a pressing force to feed rollers 128 to hold first and second cylindrical shaft surfaces 126A, 126B of feed roller shaft 124 in positive contact with first and second bearings 116A, 116B, respectively. Loading members 130 may be in the form of a leaf spring, as shown, or alternatively, may be spring biased toward feed rollers 128 by other types of springs, such as coil springs.

A drive motor (not shown) is attached to frame 112, and is located to provide rotational power to feed roller shaft 124 via gear train 120. Gear train 120 includes at least a drive gear (not shown) connected to the shaft of the drive motor and a driven gear 122 connected to feed roller shaft 124. Gear train 120 may include other gears, as shown, for driving other mechanisms of the printer, such as an exit roller assembly (not shown).

Referring again to FIG. 4, preferably, the first and second cylindrical shaft surfaces 126A, 126B are of substantially equal cross-sectional size. A circumference of each the first and second cylindrical shaft surfaces 126A, 126B is defined by a shaft radius 134 extending from a rotational axis 136 of feed roller shaft 124.

Figure 5A:
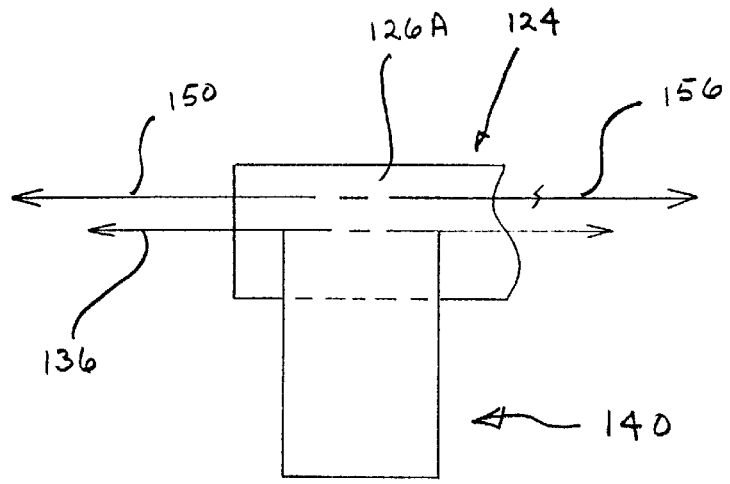
FIGS. 5A and 5B are a partial front view and a side view, respectively, of the bearing structure of FIG. 4.
Figure 5B:
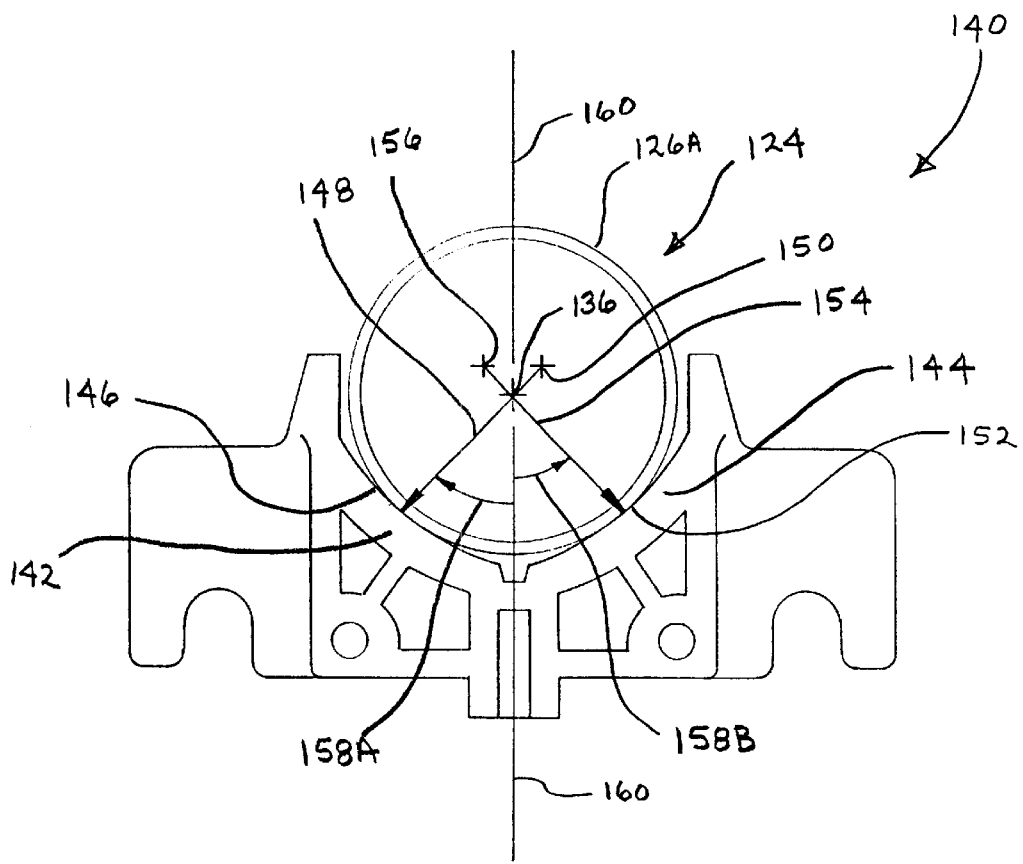

FIGS. 5A and 5B show a preferred bearing structure 140 of the invention which can be used for bearings 116A and 116B of FIG. 3. FIG. 5A shows a front view of bearing structure 140 adapted to cradle first cylindrical shaft surface 126A of feed roller shaft 124. It is to be understood that any discussion that follows directed to the interaction between bearing structure 140 (utilized for first bearing 116A) and first cylindrical shaft surface 126A would be equally applicable to the interaction of bearing structure 140 (utilized for second bearing 116B) and second cylindrical shaft surface 126B. FIG. 5B shows a side view of bearing structure 140.

As shown in FIGS. 5A, 5B, bearing structure 140 includes a first bearing flank 142 and a second bearing flank 144. First bearing flank 142 includes a first bearing surface 146 having a shape in cross-section defined by a first arc having a first radius 148 extending from a first surface axis 150. Second bearing flank 144 includes a second bearing surface 152 having a shape in cross-section defined by a second arc having a second radius 154 extending from a second surface axis 156. First bearing flank 142 and the second bearing flank 144 are structured and adapted such that first bearing surface 146 and second bearing surface 152 together in cross-section form a concave shape for receiving first cylindrical shaft surface 126A of feed roller shaft 124. As is shown in FIG. 5B, first cylindrical shaft surface 126A of feed roller shaft 124 rests against first bearing surface 146 and second bearing surface 152 to achieve absolute location of feed roller shaft 124 when feed roller shaft 124 is acted upon by the downward force exerted by backup roller assembly 118 (see FIG. 3).

As shown in FIG. 5B, the first arc having first radius 148, which corresponds to first bearing surface 146 and the second arc having second radius 154, which corresponds to second bearing surface 152, are non-concentric, in other words, first radius 148 of first bearing surface 146 does not share a common center point, or axis, with second radius 154 of second bearing surface 152.

Figure 6:
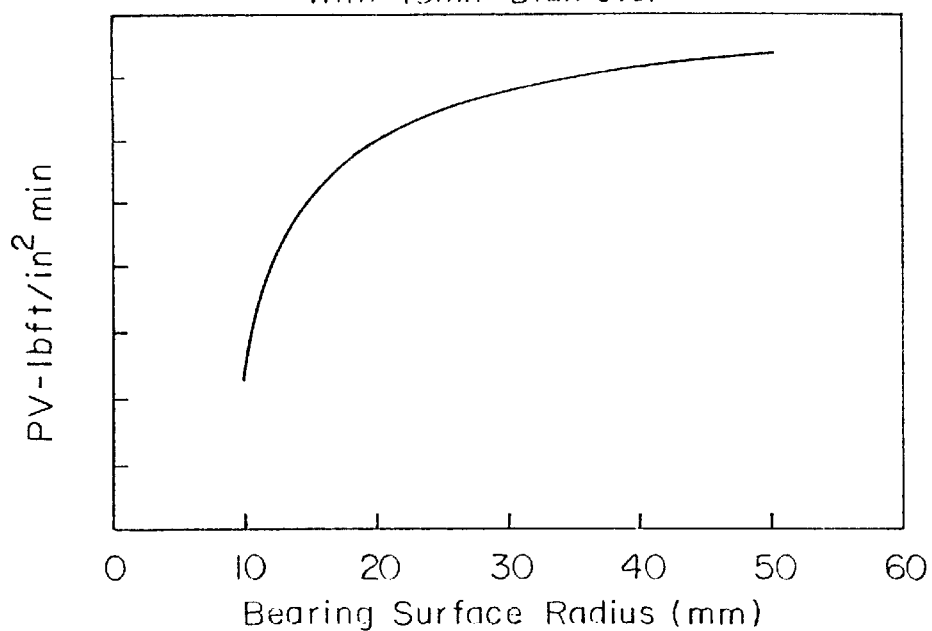
FIG. 6 is a graph depicting Pressure–Velocity versus bearing flank radius.

FIG. 6 graphically depicts Pressure×Velocity (PV) versus bearing flank radius for bearing structure 140, assuming a feed roller shaft having an 18 mm diameter. In a preferred embodiment, each of first radius 148 and second radius 154 is selected to be about 20 to about 25 percent larger than the shaft radius of feed roller shaft 124, and more preferably, about 22 percent larger than the shaft radius. However, any radius larger than the feedroller radius could be beneficial. Also, in this preferred embodiment it is preferred that first radius 148 and second radius 154 are substantially identical. Still further, it is preferred that first cylindrical shaft surface 126A tangentially contacts each of the first bearing surface 146 and the second bearing surface 152 at an angle 158A and 1558B, respectively, in the range of about 21 degrees to about 45 degrees as measured from a line perpendicular to the tangential contact with respect to a plane of symmetry 160 intersecting rotational axis 136 of feed roller shaft 124, and more preferably, the angle is selected to be about 33 degrees. It is to be understood, however, that the plane of symmetry may be arranged to be vertical (as shown), or may be rotated to deviate from vertical so as to balance the force vectors acting on feedroller shaft 124.

The particular location selected for each of radii lines 148, 154 shown in FIG. 5B also corresponds to the location of each of the lines which are perpendicular to the tangential contact. Plane of symmetry 160 essentially defines a line of division between first bearing flank 142 and second bearing flank 144, wherein first bearing surface 146 and second bearing surface 152 are located on opposing sides of plane of symmetry 160, and preferably, are symmetrical with respect to plane 160. Angle 158A is substantially equal to angle 158B with variation of less than plus or minus 5 degrees.

The radii for bearing surfaces 146, 152 are selected in order to achieve a specific PV based on the operating conditions encountered by imaging apparatus 110. As shown in FIG. 6, as the radius of the bearing surface 146, 152 decreases to approach the radius of the feed roller shaft, the contact area between the feed roller shaft and the bearing surfaces increase and the pressure drops. This reduced pressure results in a reduced PV, and therefore, reduced wear. For example, where feed roller shaft 124 has a diameter of 18 mm (a radius of 9 mm), a bearing surface radius selected to be 11 mm will result in a tangent contact of each bearing surface 146, 152 with the feed roller cylindrical shaft surface 126A at an angle 158A and 158B, respectively, of about 33 degrees as measured from the line perpendicular to the tangential contact with respect to plane of symmetry 160. In the present embodiment, this 33 degree angle imparts the lowest frictional forces on feed roller shaft 124, while ensuring that the force balance between the feed roller gear train 120 and backup roller assembly 118 holds feed roller shaft 124 in contact with bearing structure 140 at all times.

The relatively low PV nature of the bearing structure 140 of FIGS. 5A and 5B allows conventional thermoplastic materials to be utilized instead of more expensive polyimide alternatives. In the particular design described herein with the selected loads and the velocity used, the operating PV of bearing structure 140 with a 11 mm radius for each of bearing surfaces 146, 152 is approximately 70,000 PSI×Ft./Min., which is a substantial improvement over the 150,000 PSI×Ft./Min. PV that would be experienced by a flat surfaced V-shaped bearing.

By reducing the radius 148, 154 of first and second bearing surfaces 146, 152 the PV of bearing structure 140 can be further reduced. The alignment between feed roller shaft 124 and bearing structure 140 will become critical as the bearing surface radius 148, 154 of bearing surfaces 146, 152 falls below 10 mm in order to reduce binding. A material for the composition of bearing structure 140 presently preferred is Lubricomp PDX-J-96788 (limiting PV rating of approximately 130,000 PSI×Ft./Min. at 100 ft./Min.) from LNP Engineering Plastics Inc.

Figure 7:
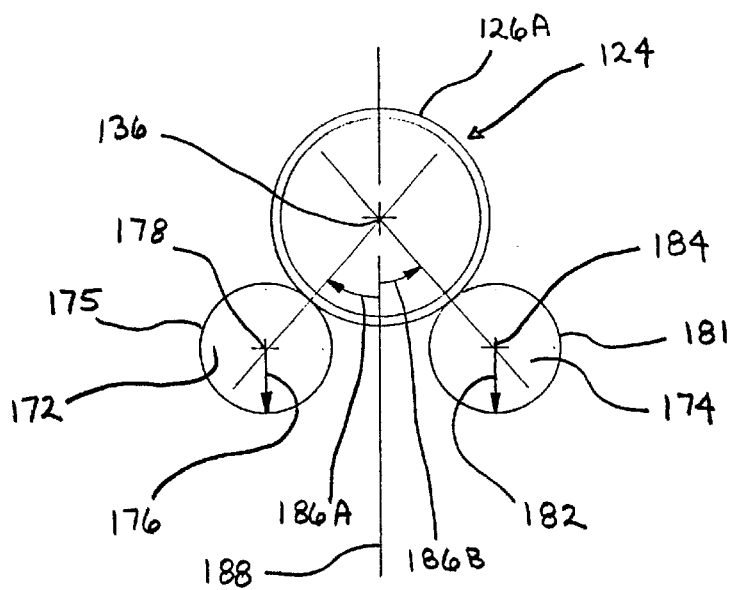
FIG. 7 is another embodiment of a bearing structure which incorporates the principles of the present invention.

FIG. 7 shows a side view of another bearing structure 170 which can be used for bearings 116A, 116B of FIG. 3. Bearing structure 170 includes a first roller bearing 172 and a second roller bearing 174. First roller bearing 172 includes a first bearing surface 175, and a first radius 176 which extends from a first bearing axis 178 to first bearing surface 175. Second roller bearing 174 includes a second bearing surface 181, and a second radius 182 which extends from a second bearing axis 184 to second bearing surface 181. Cylindrical shaft surface 126A tangentially contacts each of first bearing surface 175 and second bearing surface 181 at an angle 186A, 186B, respectively, in the range of about 21 degrees to about 45 degrees as measured from a line perpendicular to the tangential contact with respect to a plane of symmetry 188 which intersects rotational axis 136. Preferably, each of first radius 176 and second radius 182 is smaller than the shaft radius 134 of feed roller shaft 124. Also, it is preferred that angles 186A and 186B be substantially equal, with a variance of less than 5 degrees, and more preferably, a variation of about 0 degrees.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An imaging apparatus, comprising:
    a frame;
    a feed roller assembly, said feed roller assembly including
        a feed roller shaft having a cylindrical shaft surface and at least one feed roller secured to said feed roller shaft, said cylindrical shaft surface being defined by a shaft radius extending from a rotational axis of said feed roller shaft; and
    at least one bearing coupled to said frame and positioned for locating said feed roller shaft in rotatable engagement with said at least one bearing, said bearing including:
        a first bearing flank including a first bearing surface having a shape in cross-section defined by a first arc having a first radius extending from a first surface axis; and a second bearing flank including a second bearing surface having a shape in cross-section defined by a second arc having a second radius extending from a second surface axis, wherein said first bearing flank and said second bearing flank are structured and adapted such that said first bearing surface and said second bearing surface together in cross-section form a concave shape in which said first bearing surface and said second bearing surface are non-concentric, and wherein a portion of each of said first bearing surface and said second bearing surface contact said cylindrical shaft surface.

2. The imaging apparatus of claim 1, wherein each of said first radius and said second radius is larger than said shaft radius.

3. The imaging apparatus of claim 2, wherein said first radius and said second radius are substantially identical.

4. The imaging apparatus of claim 1, wherein each of said first radius and said second radius is selected to be about 20 to about 25 percent larger than said shaft radius.

5. The imaging apparatus of claim 4, wherein said first radius and said second radius are selected to be about 22 percent larger than said shaft radius.

6. The imaging apparatus of claim 1, wherein said bearing is further defined by a plane of symmetry, said first bearing surface and said second bearing surface being located to be symmetrical about said plane of symmetry, and wherein said plane of symmetry intersects said rotational axis of said feed roller shaft.

7. The imaging apparatus of claim 6, wherein said cylindrical shaft surface tangentially contacts each of said first bearing surface and said second bearing surface at an angle in the range of about 21 degrees to about 45 degrees as measured from a line perpendicular to the tangential contact with respect to said plane of symmetry.

8. The imaging apparatus of claim 7, wherein said angle is selected to be about 33 degrees.

9. The imaging apparatus of claim 1, wherein said bearing provides absolute location of said feed roller shaft.

10. The imaging apparatus of claim 1, further comprising a backup roller assembly including at least one biased backup roller, said biased backup roller exerting a force against a portion of said feed roller assembly to hold said cylindrical shaft surface of said feed roller shaft in contact with said portion of each of said first bearing surface and said second bearing surface.

11. The imaging apparatus of claim 10, wherein said bearing provides absolute location of said feed roller shaft.

12. The imaging apparatus of claim 10, wherein said biased backup roller exerts said force against said at least one feed roller to hold said cylindrical shaft surface of said feed roller shaft in contact with said portion of each of said first bearing surface and said second bearing surface as said feed roller shaft rotates about said rotational axis.

13. The imaging apparatus of claim 12, wherein said bearing provides absolute location of said feed roller shaft.

* * * * *